United States Patent
Scholtz (10) Patent No.: US 7,856,427 B2
(45) Date of Patent: *Dec. 21, 2010

(54) SYSTEM AND METHOD FOR SUSPENDING TRANSACTIONS BEING EXECUTED ON DATABASES

(75) Inventor: Johann E. Scholtz, Austin, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,470

(22) Filed: Jul. 14, 2010

(65) Prior Publication Data

US 2010/0281006 A1 Nov. 4, 2010

Related U.S. Application Data

(63) Continuation of application No. 11/608,569, filed on Dec. 8, 2006, now Pat. No. 7,778,985.

(51) Int. Cl.
| | |
|---|---|
| G06F 7/00 | (2006.01) |
| G06F 17/00 | (2006.01) |
| G06F 7/38 | (2006.01) |
| G06F 9/00 | (2006.01) |
| G06F 9/44 | (2006.01) |
| G01R 31/28 | (2006.01) |

(52) U.S. Cl. ............ 707/703; 707/682; 707/648; 712/227; 714/724

(58) Field of Classification Search .............. None
See application file for complete search history.

(56) References Cited

U.S. PATENT DOCUMENTS

| | | | | |
|---|---|---|---|---|
| 6,041,406 | A * | 3/2000 | Mann | 712/227 |
| 6,154,856 | A * | 11/2000 | Madduri et al. | 714/27 |
| 6,279,104 | B1 * | 8/2001 | Sato et al. | 712/227 |
| 6,321,329 | B1 * | 11/2001 | Jaggar et al. | 712/227 |
| 6,324,683 | B1 * | 11/2001 | Fuh et al. | 717/124 |
| 6,499,123 | B1 * | 12/2002 | McFarland et al. | 714/724 |
| 6,708,289 | B1 * | 3/2004 | Kudo | 714/28 |

(Continued)

OTHER PUBLICATIONS

Panos K. Chrysanthis; Transaction Processing in Mobile Computing Environment; 1993; IEEE; pp. 1-6.*

*Primary Examiner*—Neveen Abel Jalil
*Assistant Examiner*—Jermaine Mincey
(74) *Attorney, Agent, or Firm*—Pillsbury Winthrop Shaw Pittman LLP (57) ABSTRACT

A database management system managing one or more databases to suspend access to at least one selected database by one or more processes or applications (e.g., message processing programs, batch messaging programs, etc.). In some instances, the one or more databases may include one or more IMS databases. Access to the at least one selected database may be suspended to enable one or more operations to be performed on the at least one selected database by the database management system and/or an outside entity (e.g., a user, an external application, etc.). For example, the one or more operations may include an imaging operation, a loading operation, an unloading operation, a start operation, a stop operation, and/or other operations. In some instances, access to the at least one selected database may be suspended without canceling transactions being executed by the one or more processes or applications on the selected at least one database.

19 Claims, 2 Drawing Sheets

U.S. PATENT DOCUMENTS

| | | | |
|---|---|---|---|
| 6,711,593 B1 * | 3/2004 | Gordon et al. | 707/615 |
| 6,766,323 B2 * | 7/2004 | Beaven et al. | 1/1 |
| 2001/0007125 A1 * | 7/2001 | Cofler et al. | 712/226 |
| 2003/0084063 A1 * | 5/2003 | DelMonaco et al. | 707/103 R |
| 2005/0240816 A1 * | 10/2005 | Iovin et al. | 714/25 |

* cited by examiner

SYSTEM AND METHOD FOR SUSPENDING TRANSACTIONS BEING EXECUTED ON DATABASES

RELATED APPLICATIONS

This application claims the benefit of U.S. patent application Ser. No. 11/608,569, filed Dec. 8, 2006, which is hereby incorporated by reference in its entirety into this reference.

FIELD OF THE INVENTION

The invention relates to the suspension of transactions being executed on at least one selected database, and more particularly, to the suspension and resumption of transactions on one or more IMS databases to enable the execution of operations that require the starting and stopping of the one or more IMS databases.

BACKGROUND OF THE INVENTION

Typically, in database management systems managing one or more databases, such as Information Management System ("IMS") databases and/or other databases, a plurality of applications or processes configured to execute transactions on the one or more databases may be managed by the database management system. The plurality of applications or processes may include processing regions implementing batch messaging programs, message processing programs, and/or other applications or processes. In some instances, other operations may be performed on the one or more databases by the database management system and/or outside entities (e.g., a user, an external application, etc.). For example, other operations may include an imaging operation, a loading operation, an unloading operation, a start operation, a stop operation, and/or other operations.

In some implementations, access of at least one selected database by the plurality of applications or process may need to be shut down during execution of one or more of the other operations. In conventional systems, this may cause "down time" during which requests for the execution of transactions by the plurality of applications and processes may be denied. In some instances, previously scheduled, or even pending, transactions may be cancelled in order to enable one or more of the other operations to be performed on the at least one selected database.

SUMMARY

One aspect of the invention may relate to enabling a database management system managing one or more databases to suspend access to at least one selected database by one or more processes or applications (e.g., message processing programs, batch messaging programs, etc.). In some instances, suspending access to the at least one selected database may include suspending, or pausing, the execution of one or more transactions being executed by the one or more processes or applications. The one or more databases may include one or more IMS databases. Access to the at least one selected database may be suspended to enable one or more operations to be performed on the at least one selected database by the database management system and/or an outside entity (e.g., a user, an external application, etc.). For example, the one or more operations may include an imaging operation, a loading operation, an unloading operation, a start operation, a stop operation, and/or other operations (e.g., operations performed and/or required by Unicenter database maintenance utilities). In some instances, access to the at least one selected database may be suspended without taking the at least one selected database "off-line," as taking the at least one selected database off-line may jeopardize continuous operations of one or more online transaction services to the at least one selected database. This may enhance the efficiency of the database management system, increase the transparency of the execution of the one or more operations on the selected at least one database, and/or provide other advantages.

In some implementations, suspending one or more applications or processes executing transactions on the at least one selected database may include replacing a sync point processor in a system directory associated with the database management system. The sync point processor may be configured to process sync points and checkpoints of a plurality of applications or processes capable of executing transactions on at least one of the one or more databases. In order to suspend the one or more applications or process that are executing transactions on the at least one selected database, it may be determined whether any of the plurality of applications or processes is currently executing one or more transactions on the one or more databases. Then, for each of the plurality of applications or processes currently executing one or more transactions on the one or more databases, a checkpoint call issued by the application or process to the sync point processor may be intercepted (by virtue of the replacement of the sync point processor in the system directory). In order to ensure that the requested checkpoint is entered, entry of a checkpoint may be initiated. A pause command may then be sent to the application or process that issued the checkpoint call to suspend any transactions being executed by the issuing application or process on the at least one selected database. Once the applications or processes executing transactions on the at least one selected database have individually received pause commands, one or more operations may be performed on the selected at least one database.

In some instances, in order to determine whether any of the plurality of applications or processes is currently executing one or more transactions on the one or more databases comprises, a plurality of intent lists may be analyzed. The plurality of intent lists may correspond with the plurality of applications or processes such that a given intent list provides a record of the databases that can be processed by a given application or process, and any transactions being executed the given application or process on the listed databases. Thus by analyzing the plurality of intent lists, the applications or processes currently processing (e.g., executing transactions on) the at least one selected database may be identified.

According to various embodiments of the invention, for a given application or process that is currently executing one or more transactions on the at least one selected database, various information related to the application or process and/or the transactions being executed may be recorded. For example, an identity of the application or process, an address of the intent list that corresponds to the given application or process in the system directory, an addresses of any entries in the intent list associated with the execution of the one or more transactions that are currently being executed by the application or process, and/or other information may be recorded. Some or all of the recorded information may be used to create a dummy intent list. The dummy intent list may be a replica of the intent list that corresponds to the given application or process. The dummy intent list may include substantially the same information as the intent list except that the dummy intent list may exclude the entry(ies) in the intent list associated with the execution of transactions that are currently being executed by the given application or process on the at least one selected database.

Prior to performing the one or more operations on the at least one selected database, the dummy intent list may be used to replace the intent list that corresponds to the given application or process in the system directory. Thus, when performance of the one or more operations is initiated by issuing a request to a transaction manager associated with the database management system, the transaction manager references the dummy intent list (which does not include the entries pertaining to the transaction(s) that are currently suspended) and coordinates the performance of the one or more requested operations.

Once the requested one or more operations are complete, the database management system may be returned to its state prior to the suspension of the pending transactions on the selected at least one database. This may include resetting the system directory (e.g., restoring the sync point processor, and any replaced intent lists), withdrawing any suspend commands that were transmitted to the plurality of applications or processes, and/or other actions.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
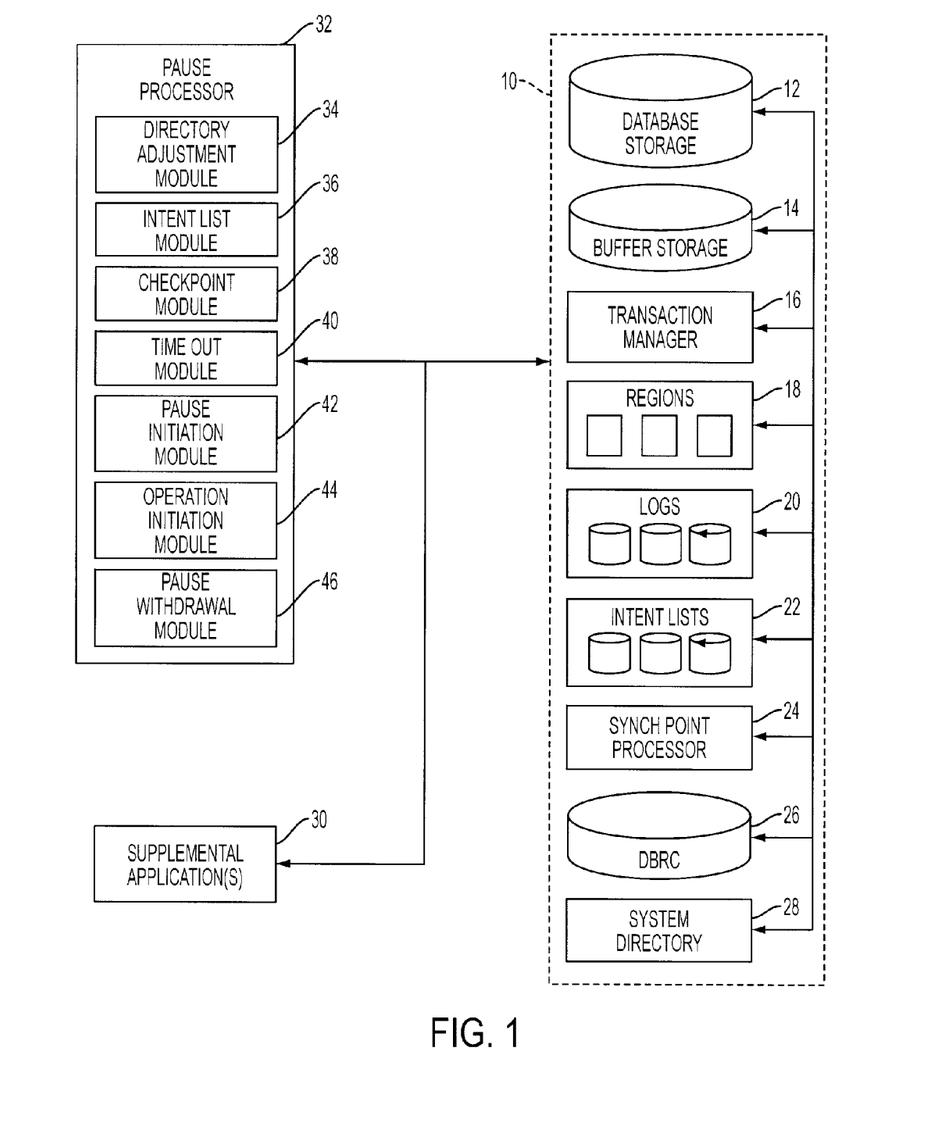
FIG. 1 illustrates a system configured to suspends transactions being executed on one or more databases, in accordance with one or more embodiments of the invention.

FIG. 1 illustrates a system 10 that manages one or more databases, according to one or more embodiments of the invention. System 10 may include database storage 12, buffer storage 14, a transaction manager 16, one or more regions 18, one or more transaction logs 20, one or more intent lists 22, a sync point processor 24, a DataBase Recovery Control ("DBRC") 26 and a system directory 28. In some embodiments, one or more supplemental applications 30 may perform operations related to one or more of the databases managed by system 10. As is discussed further below, these operations may include operations that interfere with processes and/or transactions that are regularly implemented by system 10 in the management of the databases. Accordingly, a pause processor 32 may be provided to temporarily suspend one or more of the processes and/or transactions that are regularly implemented by system 10 to enable supplemental applications 30 to perform their associated operations without substantial interference and/or conflict with the suspended processes and/or transactions.

In some embodiments, the one or more databases managed by system 10 may include one or more hierarchical databases. For example, the one or more databases may include an IMS database. The databases may be used to store, organize, manage, and/or otherwise manipulate information for any of a variety of purposes. For instance, in some embodiments, the one or more databases may include financial databases that include information related to account holders, their financial transactions, the account balances, and/or other information related to financial accounts or their holders.

Database storage 12 may include one or more electronic storage devices capable of storing information on electronically readable media included therein. Database storage 12 may include non-volatile electronic storage media such as magnetic storage media (e.g., a disk drive, a magnetic tape, e.g.), optical storage media (e.g., optical disk(s)), solid-state storage media (e.g., a flash drive), etc. Although database storage 12 is illustrated in FIG. 1 as a single entity, it should be appreciated that database storage 12 may include a plurality of storage devices. Further the plurality of storage devices may, in some instances, be located remotely from each other and communication therebetween may be accomplished via operative communication links. An operative communication link may include a wireless communication link, a hardwired communication link, a network link, a discrete communication link, and/or other communication links. In some embodiments, database storage 12 may include external DASD storage.

Buffer storage 14 may include one or more electronic storage devices capable of storing information on electronically readable media included therein. For example, buffer storage 14 may include non-volatile electronic storage media such as magnetic storage media (e.g., a disk drive, a magnetic tape, e.g.), optical storage media (e.g., optical disk(s)), solid-state storage media (e.g., a flash drive), etc. It should be appreciated that the illustration in FIG. 1 of buffer storage 14 as a single entity is merely representative. As such, the single buffer storage 14 shown in FIG. 1 may represent a plurality of storage devices. Further, in some instances, the plurality of storage devices may be located remotely from each other and communication therebetween may be accomplished via operative communication links.

In some embodiments, database storage 12 may be used to store information on a more long-term, or "permanent" basis. The use of the word "permanent" in this context may not signify that the information will be stored in perpetuity, but instead may mean that database storage 12 stores essentially all of the information included in the databases together. This information may remain unchanged until a process or application executes a transaction that alters a specific subset of the stored information. In contrast, buffer storage 14 may constitute buffers for changes that are made to the information included in the one or more databases (e.g., stored on database storage 12). As such, changes to the one or more databases may initially be stored in buffer storage 14, and later may be recorded from buffer storage 14 to database storage 12. Accordingly, buffer storage 14 may not include all of the information included in the one or more databases, but instead stores only information that has been altered and/or added relatively recently.

The buffers of buffer storage 14 may be organized on a "per database" basis (e.g., separate buffers for each database), on a "per application/process" basis (e.g., separate buffers for each application/process capable of executing transactions on the one or more databases), and/or otherwise organized. The recordation of information stored in buffer storage 14 to database storage 12 may, in some cases, be referred to as "flushing," "dumping," or "emptying" the buffers. However, it should be understood that even after the information in buffer storage 14 is recorded on database storage 12, buffer storage 14 may still hold the information until new information is stored over the previously emptied information.

In some embodiments of the invention, transaction manager 16 includes a processing entity that manages informational transactions within the one or more databases managed by system 10. For example, in the embodiments in which the one or more databases include one or more hierarchical databases, such as IMS databases and/or other hierarchical databases, transaction manager may include IMS transaction manager ("IMS TM") (a.k.a., IMS DC), CICS, Java EE, and/or other transaction managers. Transaction manager 16 may interact with an outside entity (e.g., a user, another application, etc.) to receive input to system 10 and/or provide output from system 10, process a function, maintain state in the one or more databases throughout a given transaction, ensure correct recordation of information to the one or more databases, and/or provide other functionality.

Transaction manager 16 may receive a transaction from an outside entity and may store the transaction on a queue. In order to execute the transaction, transaction manager 16 may invoke an appropriate one of regions 18. In some embodiments, regions 18 may implement one or more processes and/or applications capable of executing transactions on the one or more databases managed by system 10. For example, regions 18 may implement a business application program, such as a batch messaging program ("BMP"), a message processing program ("MPP"), and/or other business application programs, to execute transactions on the one or more databases. Regions 18 may execute a transaction on the one or more databases by entering new information, manipulating existing information, editing existing information, and/or otherwise interacting with information in the one or more databases. The execution of a transaction by one of regions 18 may include writing information to buffer storage 14 that represents addition, manipulation, edit, and/or other interaction with information included in the one or more databases. The information written to buffer storage 14 may be eventually be written to database storage 12 at an appropriate point in time, as has been discussed above.

In queuing received transactions, transaction manager 16 may build one or more intent lists 22. Intent lists 22 may include an enumeration of the one or more databases that can be processed by regions 18, and may include a list of transactions being executed on the one or more databases by regions 18. Intent lists 22 may be created on a "per region" basis (e.g., one intent list for each region). Thus, a given one of intent lists 22 may provide a record of transactions that are being executed on the one or more databases by the one of regions 18 that corresponds to the given one of intent lists 22. Entries in intent lists 22 may correspond to the one or more databases such that each entry in a given intent list 22 may correspond to one of the one or more databases. Each entry may have an entry address in one of intent lists 22.

In some embodiments, logs 20 may keep a record of changes made to the one or more databases by regions 18 in executing transactions on the databases. Depending on the types of databases being managed, the information stored within logs 20 may be more or less comprehensive. For example, for full function databases, logs 20 may store, for each transaction, the state of the information prior to manipulation during the transaction, as well as the changes made to the information by transaction. As another example, in a fast path database, logs 20 may store only the changes made to information by transactions. Logs 20 may be provided on a "per database" basis (e.g., one log for each database).

In some cases, a given one of regions 18 may execute a transaction on the one or more databases that actually includes a series of transactions or operations. For instance, the given processing region 18 may implement a BMP to execute a transaction that includes a series of transactions. As one non-limiting example, in instances in which the one or more databases include at least one financial database, a BMP may be implemented to adjust account balances stored in the at least one financial database to account for interest. This may be viewed as a single transaction (e.g., adjusting the accounts for interest) or a series of individual transactions or operations (e.g., the adjustment of each account for interest). In this type of transaction, as region 18 executes the overarching transaction, the execution of the underlying series of individual transactions or operations may give rise to discrete units of work called sync points and checkpoints. For example, upon completion of each of the underlying individual transaction or operations, sync point processor 24 may enter a sync point to system 10.

Checkpoints may be entered by sync point processor 24 when a predetermined number of sync points (e.g., representing the individual transactions or operations) have been entered. Other metrics for quantifying an amount of processing by region 18 that equals a checkpoint may be implemented, however, typically a checkpoint may be entered for a greater amount of work than a sync point. Entering a checkpoint may include initiating various operations by system 10. For example, entering a checkpoint may include initiating the recording information written to buffer storage 14 during the individual transactions or operations that have been executed since the previous checkpoint from buffer storage 14 to database storage 12. In other words, in entering a checkpoint, sync point processor 24 may update system 10 to include the processing that has been performed with respect to the current transaction being executed by region 18 (which actually includes a series of underlying individual transactions or operations). In some embodiments in which the one or more database comprise at least one IMS database, sync point processor 24 may include an IMS sync point processor, such as IMS sync point processor module DFSFXC50.

Sync point processor 24 may enter a checkpoint in response to a checkpoint call from one of regions 18. A checkpoint call may include a request for entry of a checkpoint. In some implementations of system 10 (e.g., implementing IMS), upon sending a checkpoint call to sync point processor 24, a region 18 may wait to receive a message from sync point processor 24 before resuming its current transaction. The message from sync point processor 24 may include information related to the progress of the current transaction. For instance, the message from sync point processor 24 may include a position in the one or more databases in which the transaction is currently being executed.

In some implementations, DBRC 26 may provide a record of events transpiring within system 10. For example, DBRC 26 may provide a register of the one or more databases being managed by system 10, a record of information related to images of the one or more databases (e.g., when an image was taken, which database(s) was imaged, etc.), information related to loading and unloading of the databases, information stored in logs 20, and/or other information. In some instances, DBRC 26 may organize and/or manage some of the information stored therein. For example, DBRC 26 may compile a change accumulation based on logs 20. A change accumulation may include a composite record of all of the changes recorded in the logs since buffer storage 14 was last emptied to database storage 12. The changes recorded in logs 20 may be organized in the change accumulation according to chronological order on a per database basis. This may enable the changes reflected within a change accumulation to be effected on a previous image of the one or more databases in a more efficient manner.

In some embodiments of the invention, system directory 28 may provide a directory of the components of system 10 that enables the components to communicate with each other. For example, system directory 28 may include an IMS system contents directory ("SCD"). Directory 28 may enable outside entities (e.g., external applications and/or processors) to communicate with components of system 10. System directory 28 may include a hierarchical organization of the components and their respective sub-components. In some instances, each component may have an address in system directory 28 that enables the other components to locate it.

Supplemental applications 30 may provide functionality with respect to the one or more databases managed by system 10 that are not provided by the other components of system 10. In some cases, this functionality may include functions that provide for efficient back-up and/or recovery of the one or more databases. For instance, supplemental applications 30 may include an online reorganization application that reorganizes the one or more databases while the one or more databases remain online, a "snapshot" application that enables a single point in time image of a selected one or more of the databases being managed by system 10 to be taken, a recovery enabling application that creates a recovery point for a selected one or more of the databases being managed by system 10 to be created so that the selected database(s) can be recovered in case of a system failure, and/or other functionalities.

It should be appreciated, that in order to enable the functionality of supplemental applications 30, system 10 may have to close off access to the databases from regions 18. For example, in order to enable the functionality of supplemental applications 30, system 10 may have to close off access to the databases from regions 18 to perform a DataBase Recovery ("DBR") operation in which all of the buffers in buffer storage 14 are emptied into database storage 12 and a DBR point is entered into DBRC 26. As another example, system 10 may close off access to the databases to enable an imaging operation, a loading operation, an unloading operation, a start operation, a stop operation, and/or other operations by and/or for supplemental applications 30.

In conventional database management systems, the closing off of access to one of the databases being managed by one or more regions executing transactions on the database may cause problems with respect to the integrity of the database and/or the ease of use to a user or external application. For example, closing off of access in a conventional database management system may cause the region(s) executing transactions on the database to stop abruptly without recording the progress (e.g., in logs 20, DBRC 26, etc.) of the region(s) in a manner that would enable the region(s) to seamlessly return to the interrupted transactions. For example, the region(s) may be required to repeat the interrupted transactions (which may cause a duplication of some aspects of the transactions), to treat the interrupted transactions as completed (by skipping the unexecuted portions), etc. Further, if new transactions are requested during this down time (while access to the database is closed off) by an outside entity (e.g., a user, an outside application, etc.), transaction manager 26 may not receive the new transactions, thereby causing the outside entity to have to wait and manually re-enter the new transactions.

In order to avoid at least some of the drawbacks associated with the down time to system 10 caused by closing off of access to one or more of the databases by regions 18, pause processor 32 may enable transactions being executed on at least one selected database by regions 18 to be paused until regions 18 can resume the paused transactions. This may enhance the integrity of the selected at least one database and/or provide a suspension of processing by regions 18 that is substantially transparent to outside entities. Pause processor 32 may include a processor executing machine-readable code. In some instances, the processor may also be providing the processing required by components of system 10 (e.g., transaction manager 16, sync point processor 24, etc.). In other instances, pause processor 32 may include a processor that is external to system 10 that does not provide any processing functionality to system 10 other than the processing required to implement pause processor 32. It should be appreciated that although pause processor 32 is shown in FIG. 1 as a single entity, this is for illustrative purposes only. In some implementations, pause processor 32 may include a plurality of processing units. These processing units may be physically located within the same device, or pause processor 32 may represent processing functionality of a plurality of devices operating in coordination. In instances in which a plurality of devices are implemented, operative communications links may be formed between the devices to enable communication and coordination therebetween.

In some embodiments of the invention, pause processor 32 may include a directory adjustment module 34, an intent list module 36, a checkpoint module 38, a time out module 40, a pause initiation module 42, an operation initiation module 44, a pause withdrawal module 46, and/or other modules. Modules 34, 36, 38, 40, 42, 44 and 46 may be implemented in software; hardware; firmware; some combination of software, hardware, and/or firmware; and/or otherwise implemented. It should be appreciated that although modules 34, 36, 38, 40, 42, 44 and 46 are illustrated in FIG. 1 as being co-located within a single processing unit, in implementations in which processor 32 includes multiple processing units, modules 34, 36, 38, 40, 42, 44 and 46 may be located remotely from the other modules and operative communication between modules 34, 36, 38, 40, 42, 44 and 46 may be achieved via one or more communication links. Such communication links may be wireless or hard wired. Further, it should be apparent that the functionalities provided by modules 34, 36, 38, 40, 42, 44 and 46 may be provided by other combinations of modules. For example, pause processor 32 may include more or less modules, or the functionality provided may be divided among modules 34, 36, 38, 40, 42, 44 and 46 differently, without departing from the scope of the invention.

Directory adjustment module 34 may enable manipulation of system directory 28 by pause processor 32. For example, directory adjustment module 34 may adjust system directory 28 to replace components of system 10 in system directory 28 with pause processor 32, other components of system 10, and/or other entities. As will be discussed below, directory adjustment module 34 may manipulate system directory 28 in order to facilitate the suspension of one or more transactions being performed by regions 18. For instance, upon receiving a command to suspend one or more transactions, directory adjustment module 34 may replace sync point processor 24 in system directory 28 with pause processor 32. While this replacement is in effect, all sync point and checkpoint calls to sync point processor 24 may be received by pause processor 32. As will be discussed below, pause processor 32 may analyze the sync point and/or checkpoint calls, and may forward the calls on to sync point processor 24 for processing.

Intent list module 36 may be configured to analyze, record (at least in part), duplicate, and/or otherwise process intent lists 22. In some embodiments, in response to a command to suspend transactions being executed by regions 18 on at least one selected database, intent list module 36 may analyze intent lists 22 to (i) determine whether any of regions 18 are currently executing one or more transaction on the at least one selected database, and (ii) identifying the ones of regions 18 executing one or more transactions so that some or all of the pending transactions may be suspended. This may provide pause processor 32 with a list of regions 18 that are executing transactions to be suspended.

For each one of regions 18 that is identified by intent list module 36 as executing one or more transactions to be suspended, intent list module 36 may record information related to the transactions. For example, intent list module 36 may record an identification of the region 18, an address of the intent list 22 that corresponds to the region 18 in system directory 28, an address (or addresses) of the transaction(s) to be suspended in the intent list 22 that corresponds to the region 18, and/or other information. As is discussed further below, intent list module 36 may implement some of the recorded information to create a dummy intent list that is a replica of the intent list 22 that corresponds to the region 18. In some implementations, the dummy intent list may include substantially the same information as the intent list 22 that corresponds to the region 18, with the exception that the dummy intent list may exclude the entry in the intent list 22 associated with the execution of the transaction that is currently being executed by the region 18 (e.g., the entry at the entry address in the intent list 22 stored by intent list module 36).

Checkpoint module 38 may be configured to receive checkpoint calls from regions 18 when pause processor 32 has been placed in system directory 28 in place of sync point processor 24 by directory adjustment module 34. Checkpoint module 38 may identify checkpoint calls of regions 18 that have been identified by intent list module 36 as executing one or more transactions to be suspended.

As has been explained to some extent above, upon requesting a checkpoint call, a given one of regions 18 may wait to receive a message from sync point processor 24 before resuming its current transaction. In instances in which the given region 18 has been identified by intent list module 36 as executing one or more transactions to be suspended (based on an analysis of the intent list 22 that corresponds to the given region 18), when the given region 18 has sent a checkpoint call that has been intercepted by checkpoint module 38, pause initiation module 42 may issue a pause command to the given region 18. The pause command may cause the given region 18 to suspend the execution of the transaction that caused the issuance of the checkpoint call. In some instances, the pause command may include a macro that causes the given region to wait for further commands before resuming processing. For example, the pause command may include an MVS WAIT-on-ECB macro.

Between the identification of a given region 18 as executing a transaction to be suspended by intent list module 36, and the receipt of a checkpoint call by checkpoint module 38 from the given region 18, time may be elapsing. In some instances, the time may exceed a reasonable, or workable amount of time. This may be due to any of a variety of circumstances. For example, the given region 18 may not issue checkpoint calls frequently, or may not issue checkpoint calls at all. As another example, one of the underlying transactions that forms a portion of the over-arching transaction to be cancelled may be non-responsive. In any event, time out module 40 may monitor time to ensure that pause processor 32 does not simply wait indefinitely to receive a checkpoint call from the given region 18. This may include monitoring the time that pause processor 32 has waited for the checkpoint call (e.g., from the initial command to suspend transactions on at least one selected database, from the identification of the given region by intent list module 36, etc.). If the time monitored exceeds a predetermined threshold, time out module 40 may initiate a time out process. The time out process may include withdrawing any pause commands that have been issued to regions other than the given region by pause initiation module 42, placing sync point processor 24 back in its appropriate position in system directory 28, and/or otherwise returning system 10 to its state prior to the initiation of pause processor 32.

Once pause processor 32 has received checkpoint calls for each of the regions 18 identified by intent list module 36 as executing ongoing transactions on the at least one selected database, and pause initiation module 42 has issued pause commands to each of the identified regions 18, pause processor 32 may proceed by replacing the intent lists 22 that correspond to the identified regions 18 in system directory 28 with dummy intent lists. The dummy intent lists may include dummy intent lists created by intent list module 36 in the manner provided above. The dummy intent lists may include substantially the same information as the actual intent lists 22 that corresponds to the identified regions 18, with the exception that the dummy intent lists may exclude entries associated with the transactions that are currently being executed by the regions 18 that are to be suspended. The dummy intent lists may be placed in system directory 28 in place of intent lists 22 by directory adjustment module 34.

After the dummy intent lists have been substituted for the intent lists 22 that correspond to regions 18 identified by intent list module 36 as executing transactions on the at least one selected database, pause processor 32 may initiate an operation to be performed on the at least one selected database. The operation may include an operation that requires access to the at least one selected database by regions 18 to be closed (e.g., a stop command, an unload command, a DBR command, an imaging command, etc.). The initiation of the operation may include issuing a request to perform the operation to transaction manager 16. In response to the request, transaction manager 16 may consult intent lists 22 to determine if any of regions 18 are currently executing transactions on the selected at least one database.

At this point any regions executing ongoing transactions on the at least one selected database have been suspended (e.g., due to pause commands issued by pause initiation module 42), but technically these ongoing transactions may still be present in intent lists 22. However, since pause processor 32 has replaced the address of the intent lists that correspond to the regions 18 that have been suspended with dummy intent lists, transaction manager 16 references the dummy intent lists. From the intent lists 22 that do not correspond to regions 18 that have been suspended, and from the dummy intent lists, it appears to transaction manager 16 that there are not ongoing transactions being executed on the at least one selected database and transaction manager 16 invokes that proper components of system 10 to execute the operation requested by operation initiation module 44.

Once the operation requested by operation initiation module 44 has proceeded to a point at which the suspended transactions may be resumed, pause processor 32 may return system 10 to its state prior to suspension of the suspended transactions. This may include the replacement in system directory 24 of previously replaced intent lists 22 and sync point processor 24. In order to resume the suspended transactions, pause withdrawal module 46 may withdraw the pause command that was previously issued to the regions 18 executing the suspended transactions. Withdrawing the pause command may include issuing a message that the regions 18 were expecting from sync point processor 24 in response to their previously issued checkpoint requests.

Once system directory 28 has been restored and the regions executing the suspended transactions have received the withdrawal of the previously issued pause command, the execution of the suspended transactions may resume where it was suspended. This may conclude processing by pause processor 32 until another command to initiate a pause is received.

Figure 2:
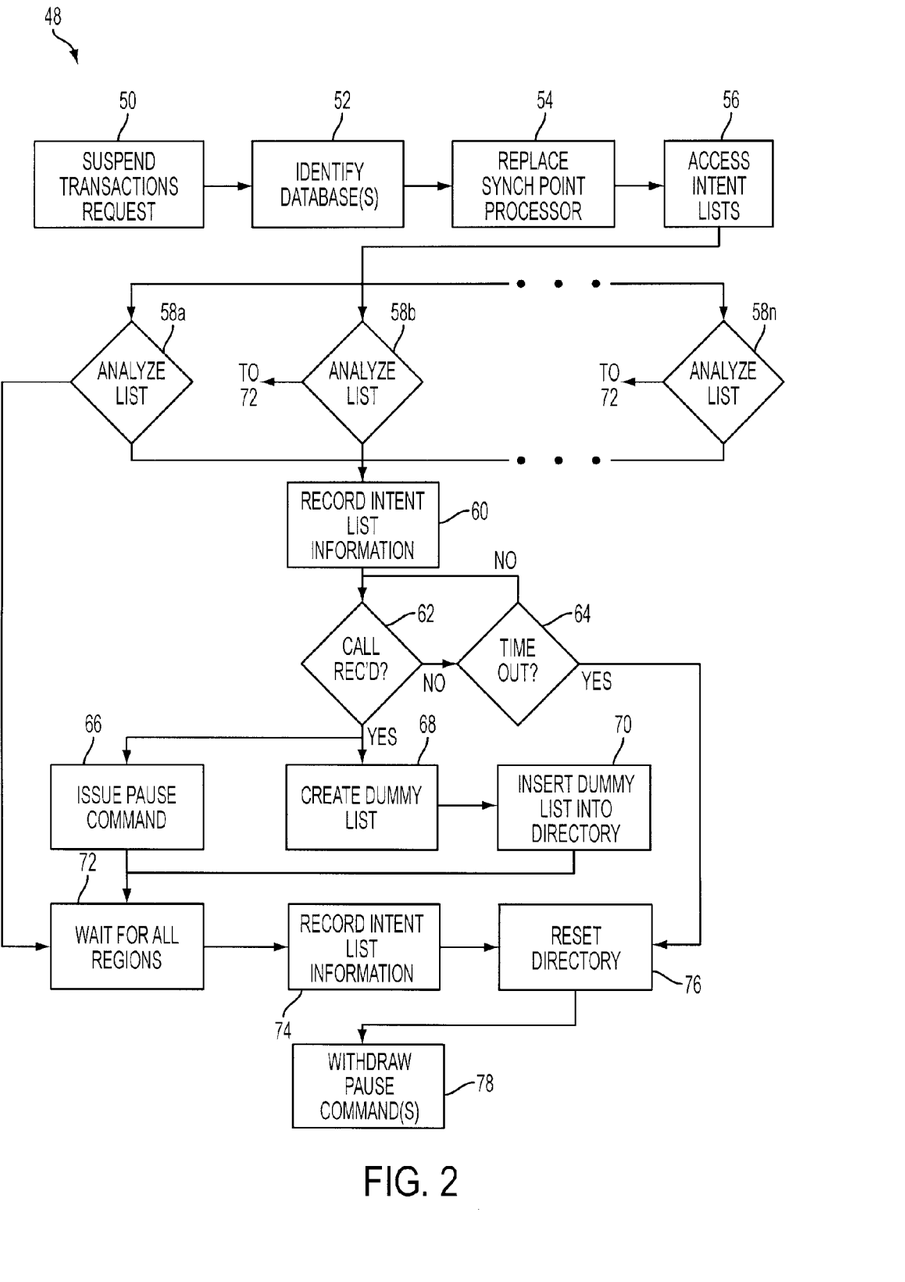
FIG. 2 illustrates a method of suspending transactions being executed on one or more databases, according to one or more embodiments of the invention.

FIG. 2 illustrates a method 48 of suspending one or more transactions being executed on one or more databases, according to one or more embodiments of the invention. Method 48 may include suspending one or more transactions to enable an operation to be performed in the one or more databases. It should be appreciated that although specific reference is made below regarding various operations of method 48 that can be executed by components of system 10 (e.g., illustrated in FIG. 1 and described above), this is for illustrative purposes. In other embodiments, systems other than system 10 may be implemented to execute some or all of the operations of method 48.

Method 48 may include a step 50, at which a request is received to suspend transactions being executed on at least one selected database. Based on the request, the at least one selected database may be identified at a step 52. In some embodiments, one or both of steps 50 and 52 may be performed by pause processor 32 (shown in FIG. 1 and described above).

At a step 54, a sync point processor may be replaced in a system directory of the system managing the at least one selected database. The sync point processor may include a processor similar to sync point processor 24 (shown in FIG. 1 and described above). In some embodiments, the sync point processor may be replaced in the system directory by a pause processor similar to pause processor 32 (shown in FIG. 1 and described above). Step 54 may be executed by a directory adjustment module similar to directory adjustment module 34 (shown in FIG. 1 and discussed above).

In order to determine any applications or processes are currently executing transactions on the at least one selected database, intent lists corresponding to applications or processes configured to execute transactions on the at least one selected database may be accessed at a step 56. The applications or processes may include applications or processes implemented by one or more regions similar to regions 18 (shown in FIG. 1 and discussed above) to execute transactions on the at least one selected database. In some embodiments, the intent lists may provide a record of present and future transactions executed by the applications or processes on the at least one selected database similar to intent lists 22 of system 10 (shown in FIG. 1 and described above). The intent lists may be accessed by an intent list module similar to intent list module 36 of system 10 (shown in FIG. 1 and described above).

At a series of one or more steps 58 (illustrated as steps 58a-58n), the accessed intent lists may be analyzed to determine whether one or more of the applications or processes configured to execute transactions on the at least one selected database are currently executing transactions on the selected at least one database. In FIG. 2 each of steps 58a-58n may represent the determination as to whether a single one of the applications or processes is currently executing transactions on the selected at least one database. In some embodiments, steps 58a-58n may be executed by an intent list module similar to intent list module 36 of system 10 (shown in FIG. 1 and described above).

If it is determined at a given one of steps 58 that an application or process is currently executing a transaction on the at least one selected database, control of method 48 may proceed, with respect to the application or process, to a step 60. In the diagram of FIG. 2, it should be appreciated that operations 60-70 (to be discussed further hereafter) are provided as a set of operations that may be performed separately for individual applications or processes that are determined to be executing transactions on the selected at least one database. While only a single operation chain from step 60 to step 70 is shown, this chain may be duplicated for separate ones of the individual applications or processes.

At step 60, information related to the intent list that corresponds to a given application or process that is currently executing a transaction on the selected at least one database may be recorded. For instance, the information may include an identification of the application or process, an address of the intent list that corresponds to the application or process in the system directory, an address of the transaction being executed within the intent list, and/or other information. In some embodiments, step 60 may be performed by an intent list module similar to intent list module 36 (shown in FIG. and discussed above).

At a step 62, a determination may be made as to whether a checkpoint call has been received from the given application or process. The checkpoint call may include a request submitted by the given application or process to the sync point processor to enter a checkpoint. The checkpoint call may be received by a checkpoint module similar to checkpoint module 38 (shown in FIG. 1 and discussed above). If a checkpoint call has not been received from the given application or process, control of method 48 may pass to a step 64. At step 64, a determination may be made as to whether a time waiting to receive a checkpoint call from the given application or process has exceeded a predetermined threshold. If the time waiting has not exceeded the predetermined threshold, control of method 48 may pass back to step 62. In some embodiments, step 64 may be executed by a time out module similar to time out module 40 (shown in FIG. 1 and discussed above).

If a determination is made at step 62 that a checkpoint call has been received, method 48 may proceed to operations 66 and/or 68. At step 66 a pause command may be issued to the given application or process. The pause command may include a macro that causes the given application or process to suspend processing until receiving further instruction. In some embodiments, the pause command may be issued by a pause initiation module similar to pause initiation module 42 (shown in FIG. 1 and described above).

At step 68 a dummy intent list may be created. The dummy intent list may be created with the information recorded at step 60. The dummy intent list may be a replica of the intent list that corresponds to the given application or process, however, the dummy intent list may exclude the entry, or entries, in the intent list that is associated with the transaction currently being executed by the application or process on the at least one selected database. In some embodiments, the dummy intent list may be created by an intent list module similar to intent list module 36 (shown in FIG. 1 and discussed above).

At a step 70, the dummy intent list created at step 68 may be placed in the system directory in place of the intent list that corresponds to the given application or process. In some embodiments, step 70 may be executed by a directory adjustment module similar to directory adjustment module 34 (shown in FIG. 1 and described above).

At a step 72, method 48 waits until all of the applications or processes currently executing transactions on the at least one selected database have been suspended. Once all of the transactions pending have been suspended, method 48 proceeds to a step 74. At step 74, an operation is initiated. The operation that is initiated may require that access to the at least one selected database by the applications or processes be stopped while the operation is executed. The operation may include an operation performed by, or in cooperation with, an external entity and/or a supplemental application similar to supplemental applications 30 (shown in FIG. 1 and discussed above). In some embodiments, step 72 may be performed by operation initiation module 44 (shown in FIG. 1 and discussed above).

Once the operation initiated at step 74 has proceeded appropriately (e.g., to completion), method 48 may proceed to a step 76 at which the system directory may be reset. This may include placing the sync point processor and the intent list(s) that had been replaced by the dummy intent list(s) back to their original positions within the system directory. In some embodiments, step 76 may be performed by a directory adjustment module similar to directory adjustment module 34 (shown in FIG. 1 and discussed above).

At a step 78, pause commands previously issued to the one or more applications or processes executing transactions on the at least one selected databases may be withdrawn. In some embodiments, step 78 may be executed by a pause withdrawal module similar to pause withdrawal module 46 (shown in FIG. 1 and discussed above).

Returning to steps 58, if at any of steps 58a-58n, for any of the applications or processes configured to execute transactions on the at least one selected database that are not currently executing transactions on the at least one selected database, method 48 proceeds from the ones of steps 58a-58n that correspond to the applications or processes not in use on the at least one selected database to step 72. This enables steps 60-70 to be executed for only those ones of the applications or processes configured to execute transactions on the at least one selected database that are actually currently executing such transactions.

Referring back to step 64, if it is determined that the time waiting for a checkpoint call from the given application or process exceeds the predetermined threshold, the method 48 may proceed from step 64 to step 76. It should be appreciated that this may include resetting the system operating according to method 48 back to its initial state (prior to step 50), as the directory may be reset at operation 76 and any previously issued pause commands may be withdrawn at operation 78.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of suspending a transaction being executed by an application on a database, wherein the transaction includes a set of operations, the method comprising:

replacing a sync point processor in a system directory with a pause processor, wherein the system directory is associated with a database management system that manages a database, and wherein the sync point processor is configured to receive checkpoint calls and to enter checkpoints to the database management system that initiate writing of one or more buffers storing portions of the database to database storage;

receiving a checkpoint call indicating that a subset of the operations included in the transaction have been completed by the application on the database;

issuing a pause command to the application that suspends the execution of the transaction on the database, wherein the pause command is issued by the pause processor that replaced the sync point processor in the system directory;

initiating execution of an operation on the database by a supplemental application, wherein the initiation of execution of the operation on the database by the supplemental application is based on the pause command to the application having been previously issued;

replacing the sync point processor in its previous location in the directory after the initiation of the execution of the operation executed by the supplemental application; and withdrawing the pause command from the application subsequent to the initiation of the execution of the operation on the database, wherein the pause command is withdrawn from the application by the pause processor that replaced the sync point processor in the system directory.

2. The method of claim 1, wherein the received checkpoint call is issued by the database management system to the sync point processor, wherein the checkpoint call is received by the pause processor that replaced the sync point processor in the system directory.

3. The method of claim 1, further comprising:

analyzing an intent list maintained by the database management system to determine if the application is currently executing a transaction on the database, wherein the intent list provides a list of databases that can be processed by the application and any transactions that are currently being executed on the databases;

responsive to the application currently executing a transaction on the database, storing an address of the application in the system directory associated with the database management system, and an address of an entry in the intent list associated with the execution of the transaction that is currently being executed by the application on the database; and prior to initiating execution of the operation by the supplemental application, (i) creating a dummy intent list that is a replica of the intent list, wherein the dummy intent list includes substantially the same information as the intent list except that the dummy intent list excludes the entry in the intent list associated with the execution of the transaction that is currently being executed by the application, and (ii) inserting the dummy intent list into the system directory associated with the database management system in the place of the intent list.

4. The method of claim 3, further comprising, subsequent to initiating execution of the operation by the supplemental application, replacing the intent list in its previous location in the system directory associated with the database management system.

5. The method of claim 1, wherein the database is an IMS database.

6. The method of claim 5, wherein the application comprises a batch message processing program.

7. A method of suspending one or more processes executing transactions on one or more databases, the individual transactions including sets of operations, the method comprising:
 receiving a command to initiate a supplemental application that requires the operation to be performed on one or more databases;
 responsive to reception of the command, replacing a sync point processor in a system directory with a pause processor, wherein the system directory is associated with a database management system that manages the one or more databases, and wherein the sync point processor is configured to receive checkpoint calls and to enter checkpoints to the database management system that initiate writing of one or more buffers storing portions of one of the one or more databases to database storage;
 determining whether any of a plurality of processes associated with the database management system are currently executing one or more transactions on any of the one or more databases, wherein each of the plurality of processes is configured to execute transactions on a given one of the one or more databases by entering, changing, or removing information from portions of the given database stored in one or more buffers that store portions of the given database;
 for each of the plurality of processes currently executing one or more transactions on the one or more databases:
  receiving a checkpoint call indicating that a subset of the operations of the transaction being executed have been completed by the process on the one or more databases; and
  issuing a pause command to the process that suspends the execution of the one or more transactions on the one or more databases by the process, wherein the pause command is issued by the pause processor that replaced the sync point processor in the system directory;
 responsive to the plurality of processes currently executing one or more transactions on the one or more databases receiving pause commands, initiating execution of an operation on the one or more databases by a supplemental application; and
 withdrawing the pause commands from the plurality of processes currently executing one or more transactions on the one or more databases subsequent to the initiation of the execution of the operation on the one or more databases by the supplemental application, wherein the pause commands are withdrawn from the plurality of processes by the pause processor that replaced the sync point processor in the system directory.

8. The method of claim 7, wherein the received checkpoint calls are issued by the processes executing one or more transactions, and wherein the checkpoint calls are received by the pause processor that replaced the sync point processor in the system directory.

9. The method of claim 7, wherein determining whether any of the plurality of processes is currently executing one or more transactions on the one or more databases comprises analyzing a plurality of intent lists to determine whether any of the plurality of processes is currently executing one or more transactions on the one or more databases, and wherein the plurality of intent lists correspond with the plurality of processes such that a given intent list provides a record of transactions being executed by the given process on the one or more databases.

10. The method of claim 9, further comprising, for each of the plurality of processes currently executing one or more transactions on the one or more databases:
 storing (i) an address of the intent list that corresponds to the process in the directory, and (ii) addresses of any entries in the intent list associated with the execution of the one or more transactions that are currently being executed by the process on the one or more databases; and
 prior to initiating execution of the operation, (i) creating a dummy intent list that is a replica of the intent list, wherein the dummy intent list includes substantially the same information as the intent list except that the dummy intent list excludes the entry in the intent list associated with the execution of the transaction that is currently being executed by the process, and (ii) inserting the dummy intent list into the directory in the place of the intent list.

11. The method of claim 10, further comprising placing the intent list(s) that were previously replaced in the directory by a dummy intent list back into their previous locations in the directory.

12. The method of claim 7, further comprising replacing the sync point processor in its previous location in the directory after initiation of the execution of the operation.

13. The method of claim 7, further comprising, for each of the plurality of processes currently executing one or more transactions on the one or more databases:
 prior to receiving the checkpoint call issued by the process executing the one or more transactions, waiting for the checkpoint call;
 determining whether an amount of time spent waiting for the checkpoint call exceeds a predetermined threshold; and
 if the amount of time spent waiting for the checkpoint call exceeds the predetermined threshold, initiating a time out process.

14. The method of claim 13, wherein the time out process comprises:
 withdrawing the pause commands from the plurality of processes currently executing one or more transactions on the one or more databases; and
 replacing the sync point processor in its previous location in the directory after execution of the operation.

15. A system adapted to suspend a transaction being executed by an application on a database, the transaction including a set of operations, the system comprising:
 electronic storage media; and
 one or more physical processors configured to perform as a pause processor that suspends a transaction being executed by an application on a database, the pause processor comprising:
  a directory adjustment module configured to replace a sync point processor associated with a database management system with the pause processor in a system directory associated with the database management system such that communications generated by applications in the database management system for the sync point processor are received by the pause processor, wherein the sync point processor is configured to receive checkpoint calls generated by applications in the database management system and to enter checkpoints to the database management system that initiate writing of one or more buffers storing portions of the database to database storage, wherein the applications in the database management system are configured to execute transactions on the database by entering, changing, or removing information from portions of the database stored in the one or more buffers, and wherein a checkpoint call received from an application in the database management system indicates that a set of transaction have been completed by the application on the database;

a pause initiation module configured to issue a pause command to an application associated with the database management system in response to the receipt by the pause processor of a checkpoint call generated by the application, wherein the pause command causes the application to suspend the execution of transactions on the database;

an operation initiation module configured to initiate execution of an operation by a supplemental application on the database subsequent to the issuance of the pause command to the application by the pause initiation module, wherein such initiation is based on the pause command having been previously issued; and a pause withdrawal module that withdraws the pause command from the application subsequent to the initiation of the operation by the operation initiation module, wherein the directory adjustment module is configured to replace the sync point processor in its previous location in the system directory subsequent to the initiation of the operation.

16. The system of claim 15, wherein the pause processor further comprises an intent list module configured to analyze an intent list to determine if the application is currently executing a transaction on the database, wherein the intent list provides a transactions being executed by the application.

17. The system of claim 16, wherein the intent list module is configured such that if the application is currently executing a transaction on the database, the intent list module records an address of the application in the directory, and an address of an entry in the intent list associated with the execution of the transaction that is currently being executed on the database.

18. The system of claim 17, wherein (i) prior to the initiation of the execution of the DBR command, the intent list module creates a dummy intent list that is a replica of the intent list, the dummy intent list including substantially the same information as the intent list except that the dummy list excludes the entry in the intent list associated with the execution of the transaction that is currently being executed on the database, and (ii) the directory adjustment module inserts the dummy intent list created by the intent list module into the directory in the place of the intent list.

19. The system of claim 15, wherein the database system is an IMS database system.

* * * * *